May 21, 1957 D. W. CORRICK ET AL 2,792,784
PRIME MOVERS
Filed Oct. 22, 1951 2 Sheets-Sheet 1
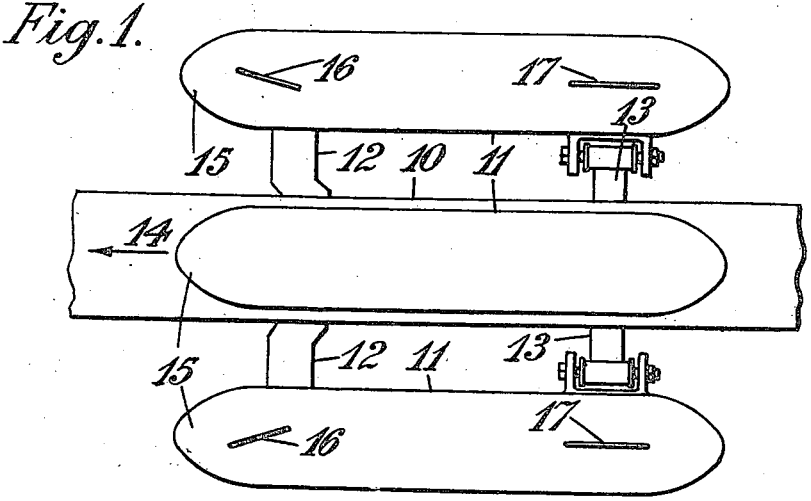
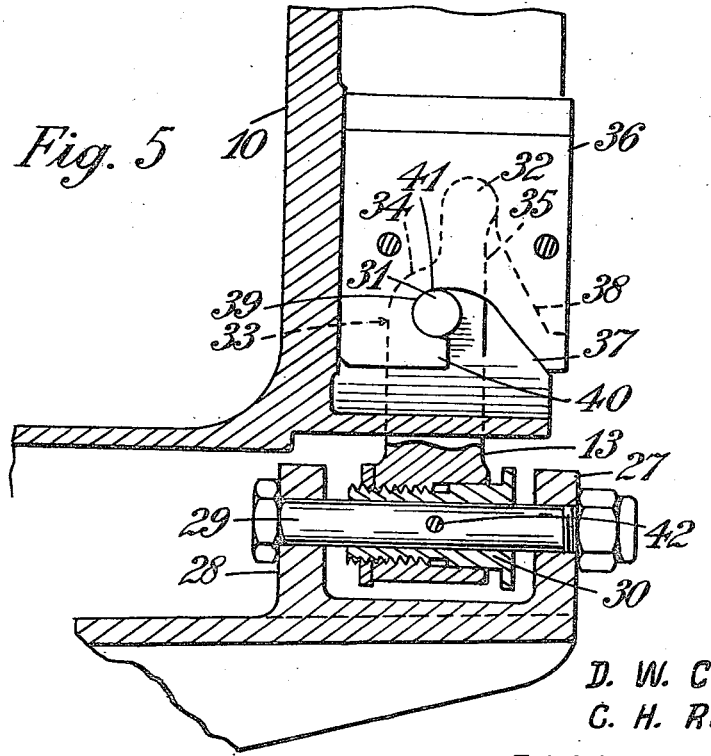
INVENTORS
D. W. CORRICK &
C. H. RUSSELL
By Wilkinson & Mawhinney
ATTORNEYS.

May 21, 1957 D. W. CORRICK ET AL 2,792,784
PRIME MOVERS
Filed Oct. 22, 1951 2 Sheets-Sheet 2
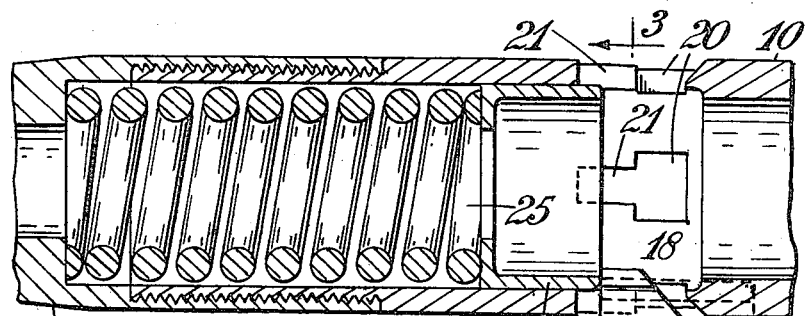
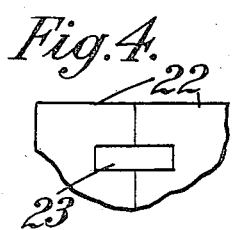
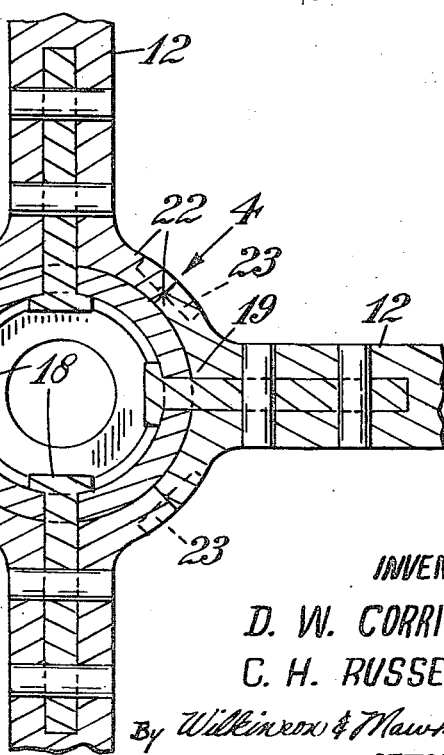
INVENTORS
D. W. CORRICK &
C. H. RUSSELL
By Wilkinson & Mawhinney
ATTORNEYS

United States Patent Office 2,792,784
Patented May 21, 1957

2,792,784
PRIME MOVERS

Denis William Corrick and Cyril Henry Russell, Bristol, England, assignors to The Bristol Aeroplane Company Limited, Bristol, England, a British company Application October 22, 1951, Serial No. 252,468

Claims priority, application Great Britain October 27, 1950

14 Claims. (Cl. 102—49)

This invention relates to vehicles of the kind which have a load, or a part, that is to be jettisoned, and is concerned with the attachment devices for effecting the jettisoning. Such vehicles include aerial vehicles of the kind whose acceleration from rest is effected by a power unit, or is assisted by an auxiliary power unit or units, called a power booster, which is jettisoned after it has ceased to exert a useful forward thrust on the vehicle, and in the specification the term "power unit" includes such auxiliary units. The term "aerial vehicle" includes aeroplanes, aerial missiles and the like, and the term "power booster" includes a rocket or other propelling device, of which one or more may be used on a vehicle.

The general practice is for power boosters to be attached to a vehicle and rendered operative just before, or as, it takes-off. The thrust from the power booster or boosters accelerates the vehicle to its flying speed much more rapidly than would be the case if it relied on its own normal power-unit. The power boosters are provided with only a limited amount of fuel, and when this has been used up so that they cease to exert a forward thrust on the vehicle, they are no longer required and their aerodynamic drag would reduce the speed of the vehicle; means are therefore provided for jettisoning the booster units after they have ceased to exert useful forward thrust.

This invention comprises for a vehicle of the kind above set forth, attachment devices, whereby the load or part is secured to the vehicle, which are arranged to permit axial movement of the load relatively to the vehicle and are automatically released by movement of the load rearwardly with respect to the vehicle. When a power unit is to be jettisoned, it is thereby ensured that as soon as the power-unit ceases to exert forward thrust, and its drag becomes effective, it is moved rearwardly and the attachment devices are released so that the power-unit is jettisoned.

According to another feature of the invention a vehicle of the kind described comprises two releasable attachment devices spaced apart lengthwise of the power-unit for securing it to the vehicle, and said devices are further characterised in that the rear device is not releasable until after the forward device has been released.

According to another feature of the invention, the attachment devices are characterised in that the rear device is released only by a predetermined angular movement of the power-unit relatively to the vehicle, or after such movement has taken place, such angular movement being permitted only by the release of the forward attachment device.

According to another feature of the invention a power-unit for use as above described is provided at its forward end with means for producing aerodynamic lift (such, for example, as an aerofoil surface) which exerts during their joint flight an outward thrust on the forward end of the power-unit in a direction away from the vehicle.

According to another feature of the invention a power-unit for use as above set forth is provided at its rear end with a lift-producing (e. g. aerofoil) surface which is at zero incidence when the power-unit is secured to the vehicle, but becomes operative when the forward end of the power-unit is displaced away from the vehicle, to exert an outward lift on the rear end of the power-unit away from the vehicle.

According to yet another feature of the invention the lift-producing surfaces aforesaid are such that in the flight conditions they exert a lift which is substantially greater than the weight of the power unit; the reason for this is that when a vehicle is provided with a plurality of power units or power boosters, they will preferably be disposed symmetrically around it and when they are jettisoned, they must be forced away from the vehicle in the direction appropriate to their location on the vehicle; it may be necessary therefore to force them upwards, or laterally, away from the vehicle as well as downwards, and although the downward movement could be effected by the weight of the power unit, the upward or lateral movements could not satisfactorily be so effected.

This invention is largely concerned with the attachment devices whereby a power unit is secured to or retained on a vehicle; such devices will ordinarily comprise two elements, which are secured respectively to the vehicle and to the power-unit, and are adapted to be engaged with or disengaged from one another.

For the sake of brevity, the term "flat hook" will be used in this specification to denote an attachment-element comprising a stem by which it is secured to one of the parts which are to be attached to one another, and a supporting limb which is engaged by the other of said parts, or by a co-operating attachment-element thereon, the hook having the characteristic that the supporting limb is flat, or substantially flat, in at least one direction, to permit disengagement by a straight sliding movement without requiring a lifting movement such as occurs when disengaging a curved limb. Such a hook may be L-shaped, in which case pressure applied to the co-operating element towards the stem will maintain the engagement, and pressure on it away from the stem will effect release.

This invention further comprises a vehicle as above described wherein at least one attachment device is a flat hook as above defined, so disposed that rearward movement of the power-unit with respect to the vehicle disengages the attachment-device; preferably the flat hook is further so arranged in relation to the direction of travel that the propulsive thrust of the power-unit maintains the attachment device in its retaining or engaged position.

Preferably the propulsive thrust of the power-unit is transmitted to the vehicle solely through the attachment device or devices.

According to another feature of this invention the power-unit is located in an intermediate position of its range of movement relatively to the vehicle by a shear-pin or equivalent device which is broken or released by the propulsive thrust of the power-unit.

According to another feature of this invention the power-unit-element of the rear attachment device is fixed against angular movement relatively to the power unit and has pivotal engagement with the vehicle at a point beyond its supporting or retaining engagement with a co-operating member fixed on the vehicle, whereby angular movement of the power-unit during its release effects a traversing movement of the power-unit-attachment-element to release it from the vehicle-attachment-element.

According to another feature of this invention, in a vehicle as above described and which has associated with it a plurality of jettisonable power units, the power units are coupled together in respect of movement relatively to the vehicle so that they can only perform such movement simultaneously, thereby ensuring that they are all released and jettisoned simultaneously. For this purpose, according to another feature of the invention, the attachment-element which is secured on a power-unit and is engaged with the vehicle or an attachment element on it, extends circumferentially of the vehicle towards the attachment element of another power unit and is interlocked therewith against relative movement by a circumferentially-extending key or tongue.

The invention also includes the novel features of construction hereinafter described in relation to one embodiment of the invention which is illustrated, by way of example, in the accompanying diagrammatic drawings.

In the drawings,

Figure 1 shows in elevation two bodies coupled together, one of which is to be jettisoned from the other, Figure 2 is a sectional view showing one attachment device, Figure 3 is a sectional view on the line 3—3 of Figure 2, Figure 4 is a view looking in the direction of the arrow 4 in Figure 3, showing a detail of the construction of the attachment device, and Figure 5 is a sectional view showing another attachment device.

In Figure 1 the reference 10 indicates the body of an aerial vehicle with which there is associated a power-unit 11 which is a power booster as above defined and which has to be jettisoned when it ceases to exert a forward thrust on the vehicle.

Normally there will be a plurality of such power boosters 11 spaced around the vehicle body 10, and each of them is attached to the vehicle 10 by a forward attachment device indicated generally by the reference 12 and a rear attachment device indicated generally by the reference 13. The direction of travel of the vehicle 10 is indicated by the arrow 14.

Each power unit 11 comprises a cylindrical body terminating at its forward end 15 in a suitably streamlined formation, and at this end there is provided a small aerofoil or fin 16 which is set at such an angle that when the assemblage is in flight it produces a force acting on the unit 11 which is directed rearwardly of the direction of flight and outwardly away from the vehicle 10. Towards the rear end of the power unit 11 there is a second aerofoil or fin 17 which when the power-unit is assembled in place is set at zero angle of incidence; when the power-unit 11 is to be jettisoned, the forward attachment device 12 is first released, and the aerofoil 16 causes the forward end to swing outwards away from the vehicle 10, and the rear aerofoil or fin 17 thereupon becomes effective to produce an outward thrust on the rear end of the power-unit 11 away from the vehicle 10.

As mentioned above, these aerofoils or fins will exert an outward force on the power-unit away from the vehicle 10 which is substantially greater than the weight of the power-unit.

The outward force on the forward end 15 of the power unit may be supplemented by an aerodynamic force due to airflow over an inclined part of the body of the power unit, said surface being produced by offsetting the nose from the lengthwise axis of the unit so that the nose is nearer to the vehicle 10 than said axis. The entire outward force may be due to the inclined part of the body of the unit, the fins 16 being dispensed with.

The construction of the forward attachment device 12 is illustrated in Figures 2, 3 and 4. The attachment device 12 consists of an arm which is rigidly secured to the power unit 11 and is provided at its other end with a T-shaped toe 18, and on its rear edge with a heel 19. The vehicle 10 is provided with a number of T-shaped slots 20, one for each power unit, with the stem 21 of the T projecting forward, and the dimensions of the slot are such that the toe 18 can be inserted through the cross-bar of the T-slot and then moved so as to bring the arm 12 into the narrow part 21 of the T-slot with the toe 18 engaging the inner surface of the wall of the vehicle 10, as shown in Figure 3. It will be appreciated that the toe 18 in its engagement with the wall of the vehicle 10 constitutes a flat hook as above defined.

The heel 19 aforesaid engages the outer surface of the wall of the vehicle 10 and is extended circumferentially at 22 (Figure 3) so as to abut the heel member of each of the adjacent arms 12. The extensions 22 are slotted on their outer surface in line with one another so that a key 23 can be fitted tightly into the aligned slots to lock the arms together against relative movement axially of the vehicle (Figure 4). All the power-units on the vehicle are secured together in this way as shown in Figure 3, and it will further be seen that when the toes 18 have been brought into their engaging position, each power-unit is located on and attached to the vehicle whatever may be its situation on the vehicle, i. e. below, above or at the side, since support is provided by both the toe 18 of the T and the heel 19.

There is provided inside the vehicle 10 a piston 24 which is pressed by a spring 25 towards the T-slots 20, so that the skirt of the piston engages the inner ends of the arms 12. To permit assembly of the power units to the vehicle, the spring is released so as to withdraw the piston 24, by unscrewing the part 26 of the body which constitutes the abutment for the spring.

The rear attachment device 13 (see Figure 1) is illustrated in Figure 5. The power-unit 11 is provided with lugs 27, 28 spaced apart lengthwise of the unit and forming end supports for a pin 29 which is parallel with the longitudinal axis of the power unit and vehicle.

A bush 30 is mounted on the pin 29 and is of less length than the space between the lugs 27, 28 so that it can float endwise in either direction from a neutral position, as will be explained later. The arm 13 which forms the attachment to the vehicle 10 is mounted on the bush 30, being screw-threaded thereon to facilitate the adjustment of its position. This arm 13 carries a laterally projecting pin or pins 31 and terminates in a tongue 32 which is of rounded form. The forward edge of the arm 13 has a plane face 33 and a rounded shoulder 34, and the rear edge 35 of the arm 13 is straight except where it merges into the rounded end 32.

On the vehicle 10 is secured a cam plate or plates 36 providing two cam tracks 37 and 38 respectively. The cam track 37 on its rear side slopes inwards at an angle of about 65° and merges into a parallel-sided slot 41 which accommodates the pin 31, and the forward face of this cam track is shaped to conform to the shape of the arm 13 as shown at 33, 34. It will be seen that when the parts are assembled in the position shown in Figure 5, the pin 31 rests on the hook-shaped part 40 which is a "flat hook" as defined above, and that owing to the extension of the arm 13 beyond the pin 31 to the rounded nose 32, the pin 31 can be disengaged from the hook 40 only by an angular movement of the arm 13 about the end 32 as a fulcrum, and similarly angular movement in the opposite direction is necessary to engage it.

To attach the power-units to the vehicle, each in turn is presented to the vehicle so that the rear attachment is the first to be engaged, the rear end of the power-unit being nearer to the vehicle than is the front end so that their longitudinal axes are inclined at an angle somewhat greater than 20°. The rounded end of the arm 32 rides up the cam surface 38 and the pin 31 rides up the cam surface 37, this being achieved by moving the rear end of the power-unit towards the vehicle and at the same time tilting it so as to reduce the inclination of the power-unit to the vehicle. When this movement has been continued sufficiently far, the forward attachment arm 12 is entered into the T-slot 20 (Figure 2) as above described, and the whole power-unit is then moved forward so as to engage the toe 18 with the wall of the vehicle on each side of the stem of the T-slot. During this axial movement of the power-unit, the rear attachment, namely the pin 31 and hook 40, is in the position shown in Figure 5 and the axial movement of the power-unit is permitted by a sliding movement of the bush 30 on the pin 29, it being appreciated that the arm 13 (Figure 5) is always maintained at right-angles to the axis of the pin 29. The power-unit is thus supported on the vehicle and the dimensions of the T-slot for the forward attachment device and of the various parts of the rear attachment device are such that it is supported in a position in which the bush 30 occupies a neutral or intermediate position on the pin 29 with a clearance at each end between the ends of the bush and the lugs 27, 28 respectively. The other power-units are similarly mounted in place and they are aligned with one another at their forward ends so that the slots formed in the heel of each forward attachment device are aligned with one another and the keys 23 can be driven in so as to lock all the power-units against relative longitudinal movement. In this position each bush 30 occupies a neutral position on its pin 31, and a shear-pin 42 is inserted through the arm 13, bush 30 and pin 29 to lock them in position so that the whole assemblage of vehicle and power-units is now locked together and can be handled for transport and launching without any possibility of longitudinal movement of the power-units with respect to the vehicle.

To launch the vehicle, the complete assembly is placed on a suitable launching ramp comprising, for example, two upwardly inclined rails spaced apart so that front and rear feet on two diametrically opposite power-units can slide along them. At the lower end of the rails there is a stop against which the rear feet of the two guided power-units can rest. The launching is effected by starting up the main power plant of the vehicle, if such is used, and also by starting the auxiliary power units 11; these may be rockets which are ignited when the main power unit is started. Each power unit 11 immediately exerts a powerful forward thrust on the unit which breaks its shear-pin 42 so that the power unit is then free to move forwardly with respect to the vehicle until the lug 27 (Figure 5) engages the end of the bush 30 and transmits a thrust through it to the arm 13 and thence through the pin 31 and other associated parts to the vehicle. This forward movement of the power-unit also moves the front attachment device 12 forwardly in its T-slot 20, and through the piston 24 it compresses the spring 25 and finally engages the end of the narrow part 21 of the T-slot. The direction of the forces at each attachment point is such as to prevent separation of the power-units from the vehicle as long as the former exert a thrust on the latter. The vehicle and its attached power-units thus emerge from the launching apparatus as a locked assembly, and so continue as long as the power-units exert forward thrust on the vehicle. When the power-units have used up their fuel they cease to exert a forward thrust on the vehicle, and instead their aerodynamic drag becomes effective on them in a direction rearwardly relatively to the vehicle. Since the shear-pins 42 were broken by the propulsive thrust, the power-units are free to move backwards and they do so in unison, being locked together by the keys 23 (Figure 4). This is required since they may not all cease to exert propulsive thrust at exactly the same instant, and it may even happen that one rocket might misfire and not exert propulsive thrust at all. The jettisoning of a single power-unit would disturb the equilibrium of the assembly, as would the jettisoning of a number of them at different times, so that the vehicle might be diverted from its set course. It is essential therefore that they should be released and fall away simultaneously.

When the assemblage of power-units moves rearwardly relatively to the vehicle, the toe 18 on the forward attachment device 12 of each of them reaches the larger part of its T-slot 20 and is free to pass outwards therethrough. It does this because the aerofoil 16 is exerting a very powerful thrust on the forward end of the power-unit outwards away from the vehicle. The power-unit therefore swings outwards pivoting about the rounded nose 32 (see Figure 5), and in so doing the pin 31 is disengaged from the flat hook 40 as soon as the power unit has swung through the necessary angle, about 20° as mentioned above. This swinging movement of the power unit also renders the aerofoil 17 on the rear end of the power-unit operative to exert an outward thrust on the rear end of the power-unit away from the vehicle. Since the vehicle has attained its maximum speed by the time the auxiliary boost has become inoperative the aerodynamic thrust on the aerofoils is very large and each power-unit is thrown rapidly outwards away from the vehicle, thereby preventing them fouling any part of the vehicle and leaving it perfectly free to continue its flight without diverting it from its set course.

Whilst this invention has been described as applied to the jettisoning of a power-unit from a vehicle, it may be used in other circumstances, for jettisoning other loads. In such a case the load to be jettisoned may be locked by some manually releasable detent instead of a shear-pin, so that all that is necessary is to operate the detent and the jettisoning thereafter is effected automatically by the rearward movement of the load. Also it will be appreciated that instead of using a shear-pin which is sheared by the propulsive thrust of a power-unit, any other suitable locking device may be used, provided only that it is automatically released by the propulsive effect exerted by the power-unit.

We claim:

1. Means for releasably securing a power-unit to a vehicle of the kind described comprising a forward device releasably attaching the power-unit to the vehicle, and a rearward device releasably attaching the power-unit to the vehicle, said forward device comprising cooperating attaching means carried by the vehicle and the power-unit permitting free initial axial movement of the power-unit relative to the vehicle in a direction rearwardly of the vehicle to move said means out of their attaching positions and a subsequent movement of the forward end of the power-unit through a predetermined distance away from the vehicle when the power-unit ceases to exert forward thrust and its drag becomes effective, said rearward device comprising cooperating attaching means carried by the vehicle and the power-unit permitting said free initial rearward axial movement of the power-unit without releasing the rearward attaching means and preventing further rearward axial movement of the power-unit at the rearward point of attachment until said subsequent movement of the forward end of the power-unit has taken place.

2. Means for releasably securing a power-unit to a vehicle as claimed in claim 1 wherein said rearward attaching means comprises an attachment element on the vehicle constructed and arranged so that said subsequent movement of the power-unit is an angular movement about the rear attachment element and the rear attachment element is released only after such angular movement.

3. The combination of claim 1, wherein the power-unit is provided at its forward end with means for producing aerodynamic lift which exerts during flight an outward thrust on the forward end of the power-unit in a direction away from the vehicle.

4. The combination of claim 1, wherein the power-unit is provided at its rear end with a lift producing surface which is at zero incidence when the power-unit is secured to the vehicle, but becomes operative when the forward end of the power-unit is displaced away from the vehicle, to exert an outward lift on the rear end of the power-unit away from the vehicle.

5. The combination of claim 1, wherein the power-unit is provided at its forward end with a lift-producing surface which exerts during flight an outward thrust on the forward end of the power-unit in a direction away from the vehicle, with a lift-producing surface at the rear end of the power-unit which is at zero incidence when the power-unit is secured to the vehicle, but becomes operative when the forward end of the power-unit is displaced away from the vehicle, to exert an outward lift on the rear end of the power-unit away from the vehicle, and the lift-producing surfaces are such that in the flight conditions they exert a lift which is substantially greater than the weight of the power unit.

6. In a vehicle of the kind described a plurality of jettisonable power units each secured to the vehicle by means as claimed in claim 1 wherein the power-units are coupled together in respect of movement relatively to the vehicle so that they can only perform such movement simultaneously, thereby ensuring that they are all released and jettisoned simultaneously.

7. A vehicle according to claim 6 in which the forward attachment elements have parts which extend circumferentially of the vehicle, and adjacent parts of adjacent forward attachment elements are interlocked against relative movement by circumferentially-extending keys.

8. The combination of claim 6 further comprising a spring carried by the vehicle, said spring urging all the power-units to move rearwardly with respect to the vehicle, and a locking device to prevent such movement, said locking device being releasable to permit rearward movement of the power units with respect to the vehicle.

9. The combination of claim 1, further comprising means mechanically urging the power-unit to move rearwardly with respect to the vehicle and a locking device to prevent such movement, said locking device being releasable to permit rearward movement of the power-unit.

10. The combination of claim 9 wherein said mechanically urging means comprises a spring carried by the vehicle, said spring engaging the forward attachment element and urging the power-unit rearwardly of the vehicle.

11. The combination of claim 1 further comprising retention means for locating the power-unit in an intermediate position of its range of movement relatively to the vehicle, said retention means being releasable by the propulsive thrust of the power-unit.

12. The combination of claim 1 wherein said rearward attaching device comprises a rear power-unit-attachment-element and a rear vehicle-attachment-element, said rear power-unit-attachment-element being fixed against angular movement relatively to the power-unit whereby angular movement of the power-unit following the release of said forward attaching device effects a traversing movement of said rear-power-unit-attachment-element to release it from the rear-vehicle-attachment-element.

13. For a vehicle of the kind set forth, a pair of attachment devices spaced lengthwise of the vehicle releasably securing a load to the vehicle, one of said devices comprising a pair of cooperating elements for securing the load to the vehicle, said elements carried respectively by the load and the vehicle and being relatively movable to permit axial movement of the load relatively to the vehicle, the relative movement of said elements when the load moves axially rearwardly with respect to the vehicle releasing the said one attachment device, and means causing the displacement of the forward end of the load away from the vehicle through a predetermined distance subsequent to the release of the said one attachment device, the other attachment device comprising a pair of cooperating elements for securing the load to the vehicle, said other attachment device elements carried respectively by the load and the vehicle and comprising means permitting only sufficient movement of the load rearwardly with respect to the vehicle to enable said one attachment device to be released and permitting relative movement of said other attachment device elements upon said displacement of the forward end of the load to release said other attachment device.

14. A pair of attachment devices as claimed in claim 13 wherein said displacement of the forward end of the load is an angular movement about said other attachment device and said other attachment device elements are arranged to be released only after such angular movement.

References Cited in the file of this patent

UNITED STATES PATENTS

| | | |
|---|---|---|
| 1,102,653 | Goddard | July 7, 1914 |
| 2,400,248 | Morgan | May 14, 1946 |

FOREIGN PATENTS

| | | |
|---|---|---|
| 861,605 | France | Nov. 4, 1940 |
| 653,024 | Great Britain | May 9, 1951 |